(12) United States Patent
Hao et al.

(10) Patent No.: US 9,837,930 B2
(45) Date of Patent: Dec. 5, 2017

(54) POWER SUPPLY SYSTEM AND POWER CONVERSION DEVICE

(71) Applicant: DELTA ELECTRONICS (SHANGHAI) CO., LTD, Shanghai (CN)

(72) Inventors: Feiqin Hao, Shanghai (CN); Hongyang Wu, Shanghai (CN); Xiaoming Chen, Shanghai (CN); Cheng Lu, Shanghai (CN); Tao Ge, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 15/131,187

(22) Filed: Apr. 18, 2016

(65) Prior Publication Data

US 2016/0322916 A1    Nov. 3, 2016

(30) Foreign Application Priority Data

Apr. 28, 2015   (CN) .......................... 2015 1 0210639

(51) Int. Cl.
| | |
|---|---|
| *H02M 7/48* | (2007.01) |
| *H02M 7/537* | (2006.01) |
| *H02M 7/483* | (2007.01) |
| *H02M 7/487* | (2007.01) |

(52) U.S. Cl.
CPC ............. *H02M 7/483* (2013.01); *H02M 7/48* (2013.01); *H02M 7/487* (2013.01); *H02M 7/537* (2013.01)

(58) Field of Classification Search
CPC ...... H02M 7/537; H02M 7/483; H02M 7/521; H02M 7/48; H02M 7/487; H02M 7/49; H02M 2007/4835; H02M 2007/4822
See application file for complete search history.

(56) References Cited

U.S. PATENT DOCUMENTS

| | | | | |
|---|---|---|---|---|
| 2010/0172166 A1* | 7/2010 | Singh | ...................... | H02M 1/42 363/131 |
| 2013/0094260 A1* | 4/2013 | Martini | ................. | H02M 7/483 363/97 |
| 2013/0155736 A1 | 6/2013 | Ilic | | |

(Continued)

FOREIGN PATENT DOCUMENTS

| | | |
|---|---|---|
| CN | 1347181 A | 5/2002 |
| CN | 102593869 A | 7/2012 |

(Continued)

*Primary Examiner* — Gustavo Rosario Benitez
(74) *Attorney, Agent, or Firm* — Yunling Ren

(57) ABSTRACT

The present disclosure provides a power supply system and a power conversion device. The power conversion device is used for converting electric energy outputted by a power supply module, and the power conversion device includes an electric energy conversion module and a switching module. The electric energy conversion module is configured to convert the electric energy output from the power supply module into a single-phase two-wire output or a single-phase three-wire output, and includes a half-bridge circuit, a bridge conversion circuit and a neutral line. The switching module is coupled with the electric energy conversion module, and is configured to control the electric energy conversion module to provide the single-phase two-wire output or single-phase three-wire output.

16 Claims, 17 Drawing Sheets

(56) References Cited

U.S. PATENT DOCUMENTS

| | | | | |
|---|---|---|---|---|
| 2014/0104907 A1* | 4/2014 | Shimada | ............... | H02M 7/487 363/80 |
| 2014/0376294 A1* | 12/2014 | Hu | ........................ | H02M 7/487 363/131 |
| 2015/0003127 A1* | 1/2015 | Takizawa | ................ | H02M 1/32 363/50 |
| 2015/0029772 A1* | 1/2015 | Shimada | ................. | H02M 7/48 363/132 |
| 2015/0155712 A1* | 6/2015 | Mondal | ................ | H02J 3/1857 307/23 |
| 2015/0256104 A1* | 9/2015 | Fu | ........................ | H02M 7/537 363/131 |

FOREIGN PATENT DOCUMENTS

| | | |
|---|---|---|
| JP | 10-201105 A | 7/1998 |
| JP | 2001-197757 A | 7/2001 |
| JP | 2007-221903 A | 8/2007 |
| JP | 2013-021905 A | 1/2013 |
| JP | 2014-007828 A | 1/2014 |
| JP | 2015-015782 A | 1/2015 |
| JP | 2015-027178 A | 2/2015 |
| TW | 201251295 A | 12/2012 |
| TW | 201414171 A | 4/2014 |
| WO | 2013/128589 A1 | 9/2013 |

* cited by examiner

POWER SUPPLY SYSTEM AND POWER CONVERSION DEVICE

This application is based upon and claims priority to Chinese Patent Application No. 201510210639.7, filed Apr. 28, 2015, the entire contents of which are incorporated herein by reference.

TECHNICAL FIELD

The present disclosure relates to the technical field of power supply management, and more particularly, to a power conversion device and a power supply system including the power conversion device.

BACKGROUND

Nowaday, power generation using renewable energy sources, for example, photovoltaic power generation, wind energy power generation, fuel cell power generation, has been developed from power supplies having small power at early time to grid-connected power generation as public power at present, and are developing towards quantity production and large-scale utilization, and correspondingly the application range thereof has extended to various power utilization fields.

With the proliferation of power generation using renewable energy sources, grid-connected converters are increasingly upgraded. Taking a photovoltaic power generating system as an example, grid-connected converters have developed from transformers having low-frequency isolation originally to transformers having high-frequency isolation, and finally to omission of transformers.

An equivalent photovoltaic-panel-to-ground capacitance is relatively large, and thus, in consideration of leakage current in a system loop, if an input terminal is a photovoltaic input, then circuit topologies or control modes having low leakage current shall be selected. Accordingly, various converter circuit topologies such as H4, H5 and H6 (four-switch, five-switch and six-switch) or the like are derived. However, all of these converter circuit topologies have only considered a case where electronic outputs at an output port under a grid-connected operation and electronic outputs at an output port under a standalone operation are consistent, but none of them applies to a case where the requirements of the grid-connected operation and the standalone operation are inconsistent.

Taking a converter, which has a H6 topology and low leakage current in the photovoltaic grid-connected field, as an example, as shown in FIG. 1, during the grid-connected operation, the converter provides a single-phase two-wire output at an output port, and during the standalone operation, the converter can only provide the single-phase-two-wire output as well. Apparently, the converter does not apply to a scenario where the standalone operation requires a single-phase-three-wire output. In related arts, other converter circuit topologies also have the above problems.

Therefore, there exists a need to provide a power conversion device aiming at the above problems.

SUMMARY

The present disclosure provides a power conversion device and a power supply system including the power conversion device so as to apply to a scenario where the requirements of the grid-connected operation and the standalone operation are inconsistent and consequently to overcome one or more problems caused by limitations and defects in related arts.

Other characters and advantages of the present disclosure will become apparent through the detailed descriptions hereinafter, or be known partially through the practice of the present disclosure.

According to a first aspect of the present disclosure, there is provided a power conversion device for converting electric energy outputted by a power supply module, which is coupled with first and second bus capacitors in series, the power conversion device comprising:

an electric energy conversion module configured to convert the electric energy outputted by the power supply module into a single-phase two-wire output or a single-phase three-wire output, wherein the electric energy conversion module includes:

a voltage-balanced half-bridge circuit having a bridge arm midpoint coupled with each first terminal of the first and second bus capacitors;

a bridge conversion circuit having a first input terminal coupled with a second terminal of the first bus capacitor, a second input terminal coupled with a second terminal of the second bus capacitor, and first and second output terminals providing the single-phase two-wire output; and a neutral line having a first terminal coupled with the bridge arm midpoint, and a second terminal providing the single-phase three-wire output together with the first and second output terminals of the bridge conversion circuit; and a switching module coupled with the electric energy conversion module, and configured to determine the electric energy conversion module to provide the single-phase two-wire output or the single-phase three-wire output.

According to a second aspect of the present disclosure, there is provided a power supply system comprising a first power supply module and a second power supply module which are coupled with a load through at least two wires;

wherein the first power supply module comprises a power conversion device according to the first aspect, a first port and a second port, the first port is electrically coupled to the second power supply module, and the load is selectively coupled with the first port or the second port through a selector switch;

wherein the power conversion device is electrically coupled to the first port via an output switch and a grid-connected switch, and the power conversion device is electrically coupled to the second port via the output switch; and wherein the power supply system employs at least one of the first power supply module and the second power supply module to provide power supply for the load according to the output switch, the grid-connected switch and the selector switch.

In the power conversion device and the power supply system according to exemplary embodiments of the present disclosure, the electric energy conversion module capable of converting the electric energy outputted by the power supply module into a first type output (i.e., a single-phase two-wire output) or a second type output (i.e., a single-phase three-wire output) and the switching module coupled with the electric energy conversion module are provided. Thus, during the grid-connected operation, the first type output is provided; and during the standalone operation, the second type output is provided. Consequently, the scenario where the requirements of the grid-connected operation and the standalone operation are different can be satisfied.

BRIEF DESCRIPTION OF THE DRAWINGS

The above-mentioned and other characteristics and advantages of the present disclosure will become more apparent from to detailed description of exemplary embodiments with reference to drawings.

DETAILED DESCRIPTION

Figure 1:
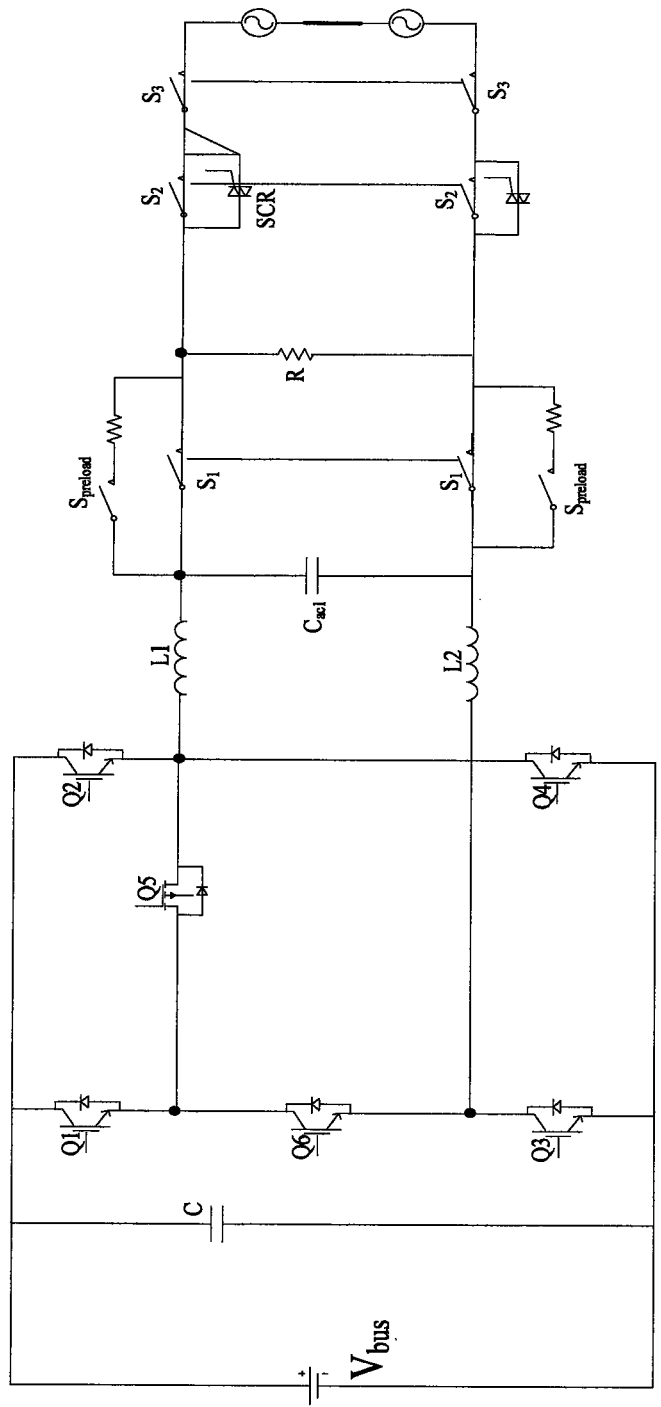
FIG. 1 is a circuit diagram schematically showing a power conversion device having an H6 topology in related arts.

Now, exemplary implementations will be described more comprehensively with reference to the drawings. However, the exemplary implementations may be carried out in various manners, and shall not be interpreted as being limited to the implementations set forth herein; instead, providing these implementations will make the present disclosure more comprehensive and complete and will fully convey the conception of the exemplary implementations to one of ordinary skill in this art. Throughout the drawings, similar reference characters indicate the same or similar structures, and their detailed description will be omitted.

The expressions "couple" and "connect" used herein may refer to that two or more elements are in direct contact with each other physically or electrically, or in indirect contact with each other physically or electrically. The expressions "first", "second", . . . , and the like used herein are only intended to distinguish elements or operations described using the same technical terms, rather than particularly define order or sequence. The expressions "include", "comprise", "have", and the like, used herein are all open terms, which means including but not limited to. Direction terms used herein, for example, "up", "down", "left", "right", "front" or "back", and the like, are only directions relative to drawings. Therefore, the direction terms used herein are intended to illustrate rather than limit the present application.

In addition, the features, structures or characteristics described herein may be combined in one or more embodiments in any suitable manner. In the following description, many specific details are provided to facilitate sufficient understanding of the embodiments of the present disclosure. However, one of ordinary skill in this art will appreciate that the technical solutions in the present disclosure may be practiced without one or more of the specific details, or other structures, components, steps, or methods, and so on may be employed. In other conditions, well-known structures, components or operations are not shown or described in detail to avoid confusion of respective aspects of the present disclosure.

Figure 2:
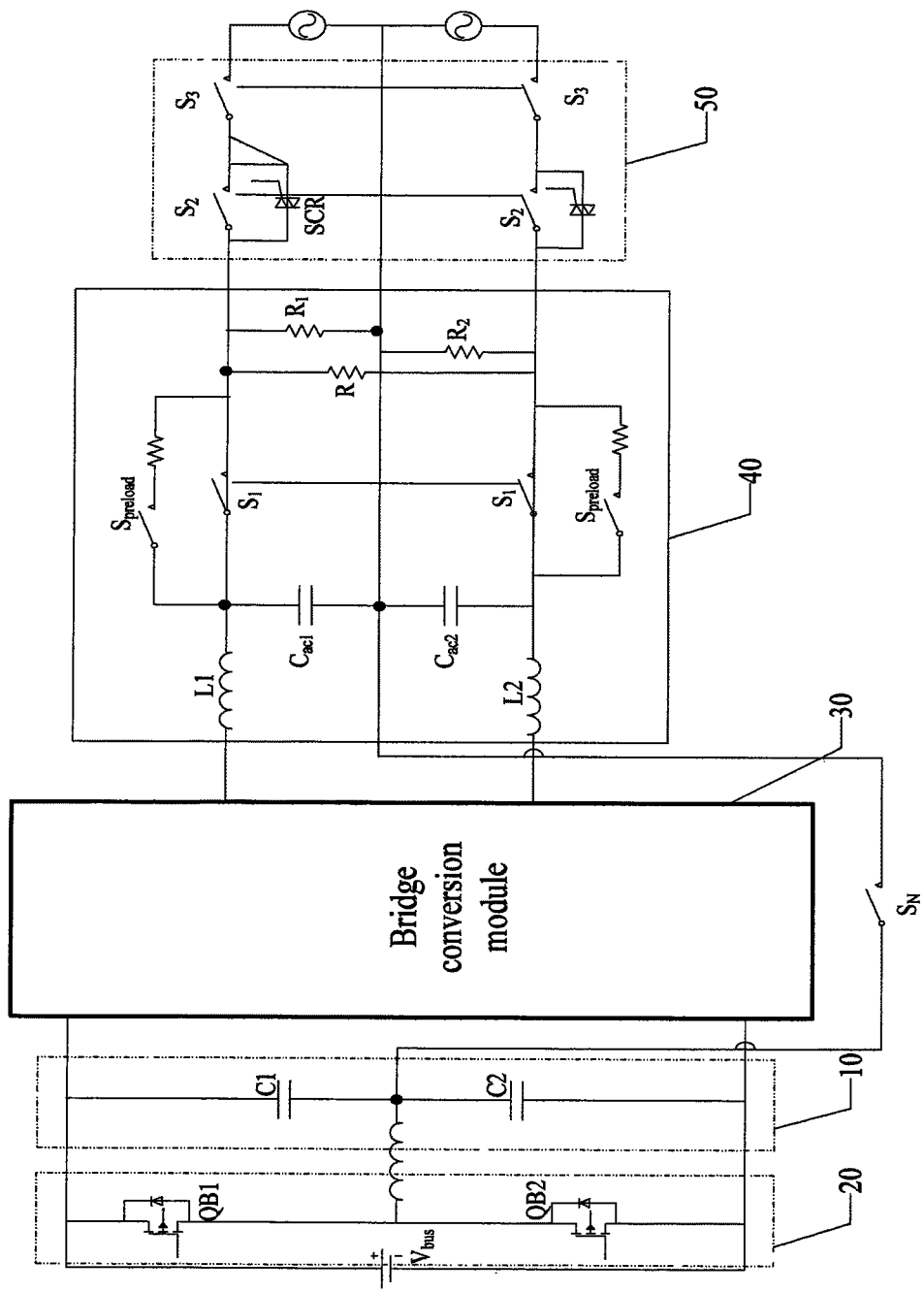
FIG. 2 is a diagram schematically showing a structure of a power conversion device according to an exemplary embodiment of the present disclosure.

FIG. 2 is a diagram schematically showing a structure of a power conversion device according to an exemplary embodiment of the present disclosure. The power conversion device is configured to convert the electric energy output by a power supply module. The power conversion device includes an electric energy conversion module and a switching module.

In the exemplary embodiment, explanations will be made by taking an example where the power supply module is a Direct Current (DC) power generation device using a renewable energy source, such as a photovoltaic power generation device or a fuel cell power generation device, which will not be specifically defined in the exemplary embodiment. The power supply module is coupled in series with a bus capacitor module 10. In the exemplary embodiment, the bus capacitor module 10 may include a first bus capacitor C1 and a second bus capacitor C2 that are coupled in series with each other. The electric energy conversion module is configured to convert the electric energy output by the power supply module into a first type output or a second type output. Corresponding to the DC power generation device using a renewable energy source, the electric energy conversion module is a Direct Current to Alternating Current (DC/AC) converter. In the exemplary embodiment, explanations will be made by taking an example where the first type output is a single-phase two-wire output and the second type output is a single-phase three-wire output. However, in other exemplary embodiments of the present disclosure, the first type output and the second type output may be other types. The switching module is coupled with the electric energy conversion module, and is configured to control the electric energy conversion module to provide the first type output or the second type output.

Again referring to FIG. 2, the electric energy conversion module in the exemplary embodiment may include a half-bridge circuit 20, a bridge conversion circuit 30 and a neutral line. In a specific exemplary embodiment, the electric energy conversion module may further include a bridge output filter circuit 40, a relay protection device 50, related switching components and a control unit, and the like.

Specifically, the middle point of the bridge arm of the half-bridge circuit 20 is coupled to a first terminal of the first bus capacitor C1 and a first terminal of the second bus capacitor C2, i.e., is coupled to a series-connection node of the first bus capacitor C1 and the second bus capacitor C2. The half-bridge circuit 20 is configured to balance voltages across the first bus capacitor C1 and the second bus capacitor C2. In the exemplary embodiment, the half-bridge circuit 20 includes a first switch QB1 and a second switch QB2, each of which may be a MOSFET (Metal-Oxide-Semiconductor Field Effect Transistor), an IGBT (Insulated Gate Bipolar Transistor) or a BJT (Bipolar Junction Transistor). Materials of the switching elements may include Si, SiC, GaN or other wide bandgap semiconductor materials or the like, which will not be specifically defined in the exemplary embodiment.

The bridge conversion circuit 30 includes first and second input terminals as well as first and second output terminals. The first and second input terminals of the bridge conversion circuit 30 are coupled with a second terminal of the first bus capacitor C1 and a second terminal of the second bus capacitor C2, respectively. The first and second output terminals of the bridge conversion circuit 30 are configured to provide the first type output (such as single-phase two-wire output). The bridge conversion circuit 30 herein may be a half-bridge inverter circuit or a full-bridge inverter circuit, and the like. Taking the full-bridge inverter circuit as an example, it may be a four-switch full-bridge inverter circuit (hereinafter referred to as H4 topology), a five-switch full-bridge inverter circuit (hereinafter referred to as H5 topology), a six-switch full-bridge inverter circuit (hereinafter referred to as H6 topology), or a seven-switch full-bridge inverter circuit (hereinafter referred to as H7 topology), and the like. In the exemplary embodiment, the switches in the H4 topology, the H5 topology, the H6 topology, the H7 topology or other topologies may be a MOSFET, an IGBT, or a BJT, and the like, and the materials of the switches may include Si, SiC, GaN or other wide bandgap semiconductor materials and the like, which will not be specifically defined in the exemplary embodiment.

A first terminal of the neutral line is coupled with the series-connection node of the first bus capacitor C1 and the second bus capacitor C2, and a second terminal of the neutral line, together with the first and second output terminals of the bridge conversion circuit 30, provides the second type output (such as a single-phase three-wire output). In the exemplary embodiment, the switching module may include a controlled switch $S_N$ arranged between the first terminal and the second terminal of the neutral line. In the exemplary embodiment, the controlled switch $S_N$ may be a bidirectional switch such as a MOSFET, an IGBT, a BJT, a thyristor, or a relay, and the like, which will not be specifically defined in the exemplary embodiment.

The operation principle and more details of the above power conversion device will be described below in detail with reference to a H6 topology.

Figure 3:
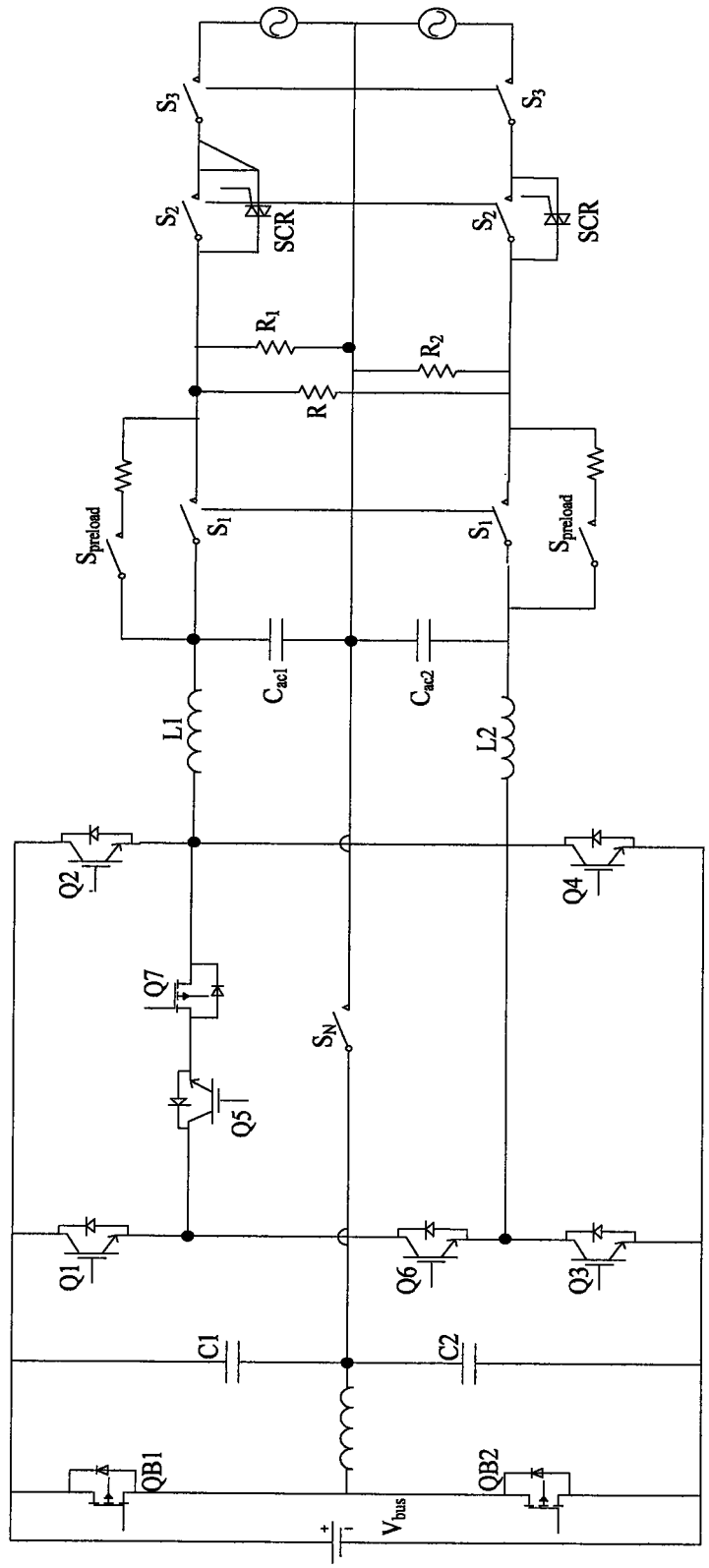
FIG. 3 is a diagram schematically showing another structure of a power conversion device according to an exemplary embodiment of the present disclosure.

As shown in FIG. 3, the bridge conversion circuit 30 in FIG. 2 includes a first switching element Q1 through a seventh switching element Q7. The first switching element Q1 includes a first terminal, a second terminal and a control terminal, and the first terminal of the first switching element Q1 is coupled with the second terminal of the first bus capacitor C1. The second switching element Q2 includes a first terminal, a second terminal and a control terminal, and the first terminal of the second switching element Q2 is coupled with the first terminal of the first switching element Q1. The third switching element Q3 includes a first terminal, a second terminal and a control terminal, and the second terminal of the third switching element Q3 is coupled with the second terminal of the second bus capacitor C2. The fourth switching element Q4 includes a first terminal, a second terminal and a control terminal, and the second terminal of the fourth switching element Q4 is coupled with the second terminal of the third switching element Q3. The fifth switching element Q5 includes a first terminal, a second terminal and a control terminal, and the first terminal of the fifth switching element Q5 is coupled with the second terminal of the first switching element Q1 and a first terminal of the sixth switching element Q6. The sixth switching element Q6 includes a first terminal, a second terminal and a control terminal, and the first terminal of the sixth switching element Q6 is coupled with the second terminal of the first switching element Q1 and the first terminal of the fifth switching element Q5, and the second terminal of the sixth switching element Q6 is coupled with the first terminal of the third switching element Q3. Moreover, in consideration of demands of topology transformation, a seventh switching element Q7 may be added as well to change the bridge conversion circuit in FIG. 3 from the H6 topology to a H7 topology. The seventh switching element Q7 may include a first terminal, a second terminal and a control terminal, and the first terminal of the seventh switching element Q7 is coupled with the second terminal of the fifth switching element Q5, and the second terminal of the seventh switching element Q7 is coupled with the second terminal of the second switching element Q2 and the first terminal of the fourth switching element Q4. The seventh switching element Q7 together with the fifth switching element Q5 realizes the effect of electrically isolating two bridge arms. In an exemplary embodiment of the present disclosure, the seventh switching element Q7 may include a switch capable of realizing electrical isolation function such as a MOSFET, an IGBT, a BJT, or a relay, and the like, which will not be specifically defined in the exemplary embodiment.

Figure 4:
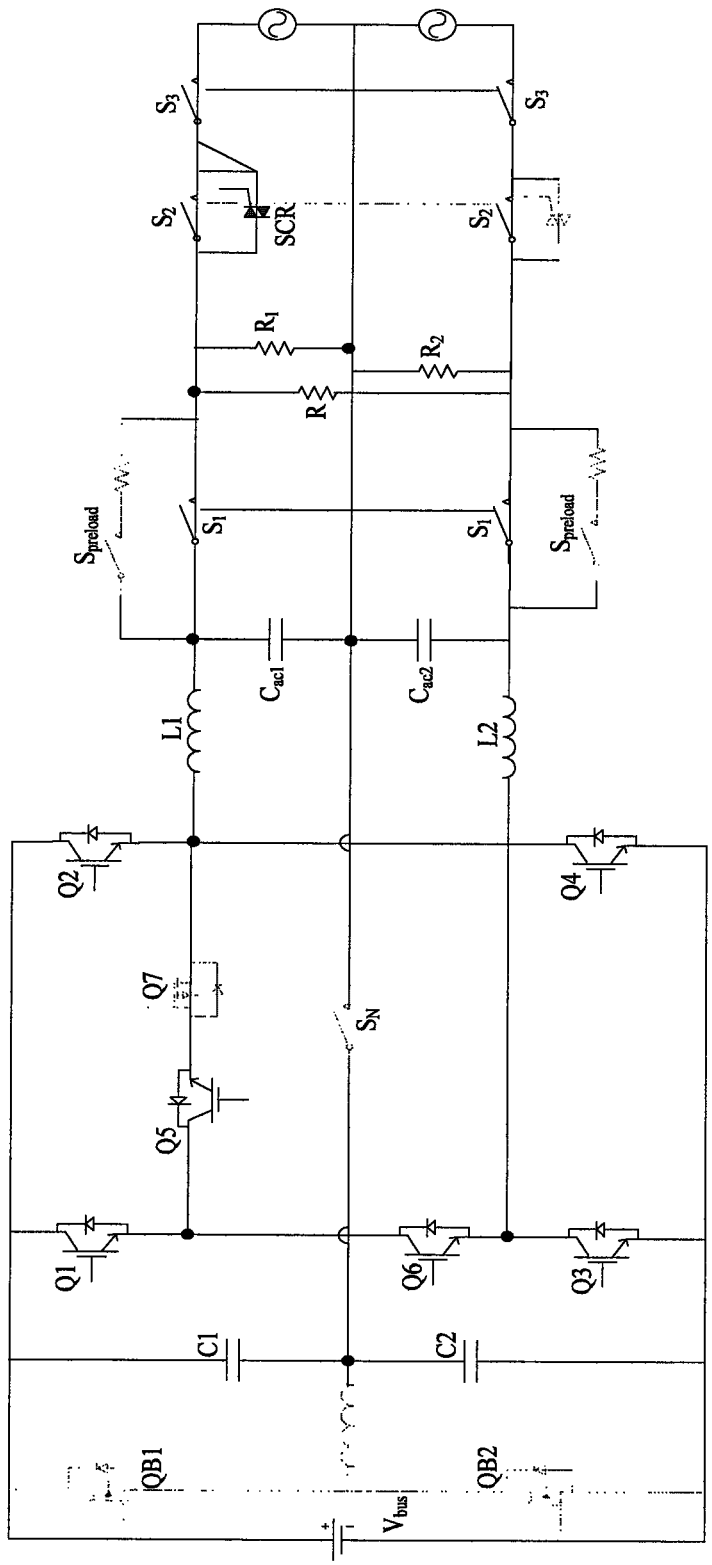
FIG. 4 is a circuit diagram when the power conversion device shown in FIG. 3 is in a grid-connected operation.

As shown in FIG. 4, during normal grid-connected operation, the above controlled switch $S_N$ is turned off and neither of the switching elements (the first switch QB1 and the second switch QB2) on the half-bridge circuit 20 works, and the seventh switching element Q7 is normally on. The inverter output of the bridge conversion circuit is filtered by the bridge output filter circuit 40, and then is coupled with a grid through the relay protection device 50. For example, the bridge output filter circuit 40 includes an inductor L1, a capacitor $C_{ac1}$, an inductor L2 and a capacitor $C_{ac2}$. The inductor L1 and the capacitor $C_{ac1}$ form an LC filter, and the inductor L2 and the capacitor $C_{ac2}$ form a LC filter.

When the grid has a failure and the power generator using a renewable energy source operates under a standalone mode, the fifth switching element Q5 and the seventh switching element Q7 are turned off, and the controlled switch $S_N$ is turned on, and thus the bridge conversion circuit is transformed into two series half-bridge inverter topologies, which are hereinafter referred to as a first inverter and a second inverter.

Figure 5:
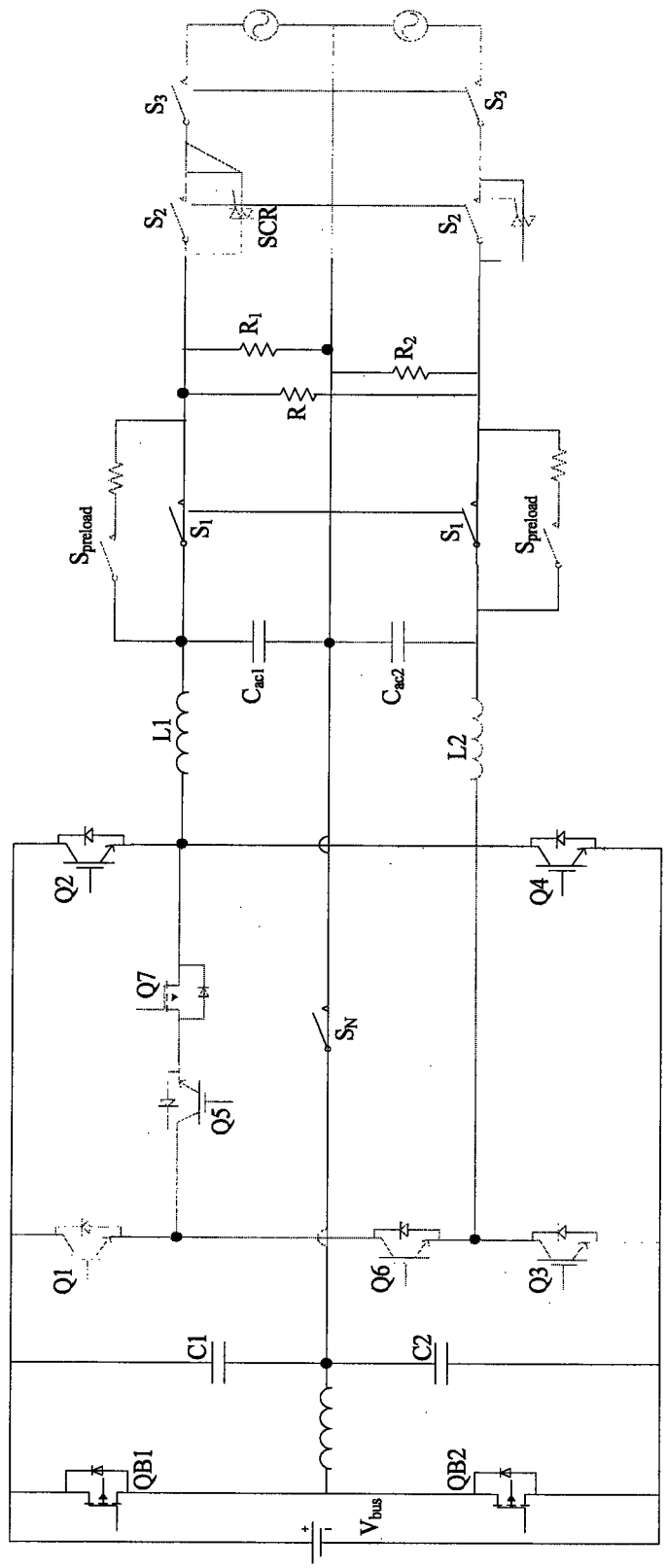
FIG. 5 is a schematic diagram of a first inverter when the power conversion device shown in FIG. 3 is in a standalone operation.
Figure 6:
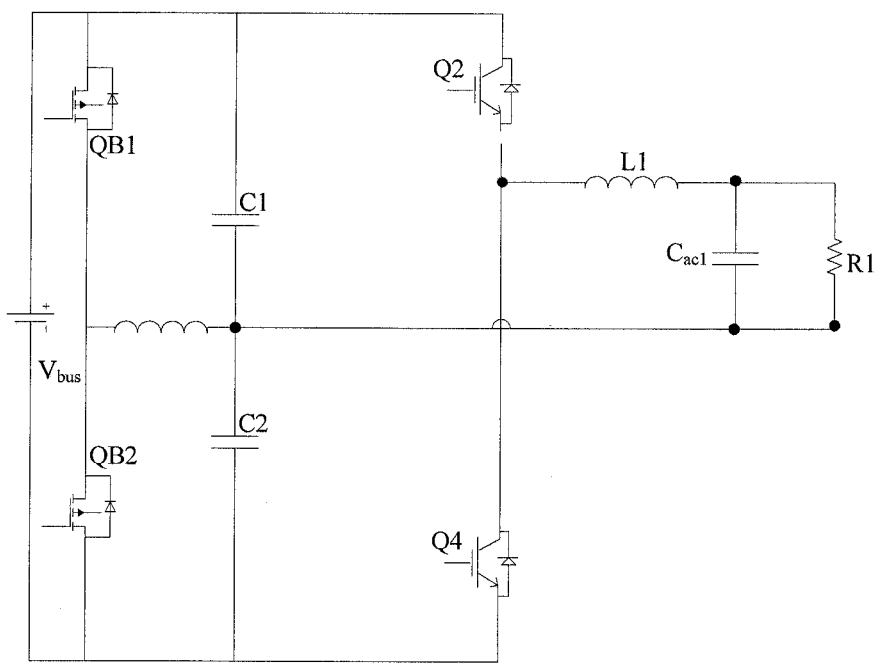
FIG. 6 is a simplified circuit diagram of the first inverter shown in FIG. 5.
Figure 7:
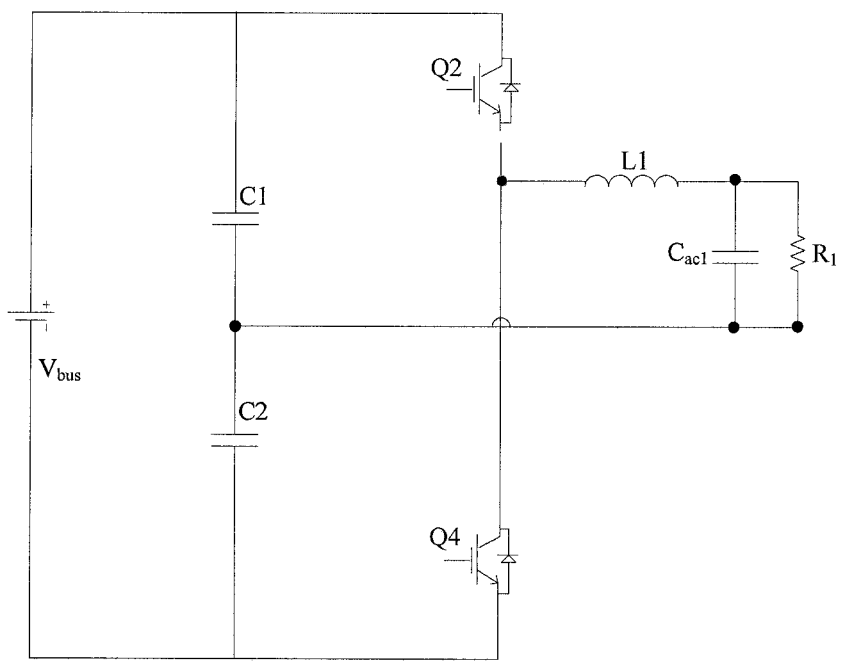
FIG. 7 is a schematic diagram of the first inverter after further simplification with neglecting of the half-bridge circuit.

In FIG. 5, the first inverter is composed of the first bus capacitor C1, the second bus capacitor C2, the second switching element Q2, the fourth switching element Q4, the first output inductor L1 and the first output capacitor $C_{ac1}$. The topology of the first inverter after simplification is as shown in FIG. 6. It is supposed that the half-bridge circuit 20 can ideally control the voltage balance between the first bus capacitor C1 and the second bus capacitor C2, and then the topology after further simplification is as shown in FIG. 7. The modulation mode of the first inverter may be a conventional half-bridge control mode, in which the output voltage closed loop control would produce the controlled duty cycle to the second switching element Q2, and the fourth switching element Q4 and the second switching element Q2 are complementary to each other.

Figure 8:
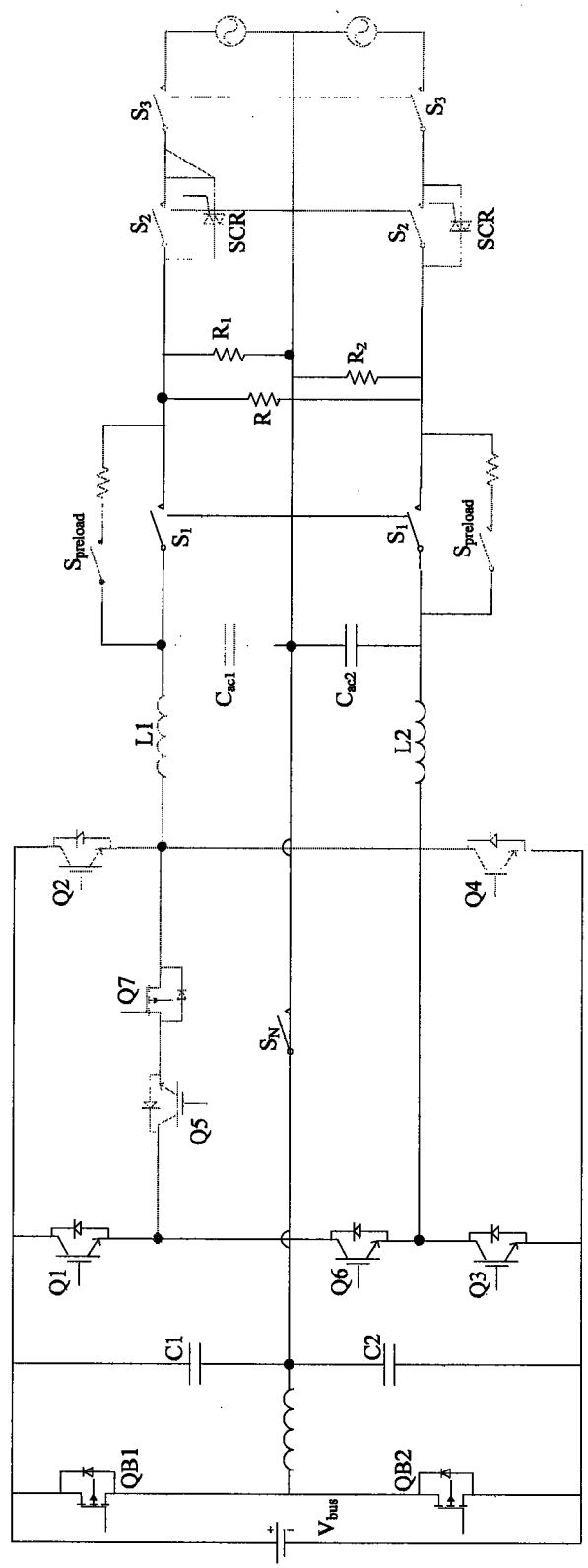
FIG. 8 is a schematic diagram of the second inverter when the power conversion device shown in FIG. 3 is in a standalone operation.
Figure 9:
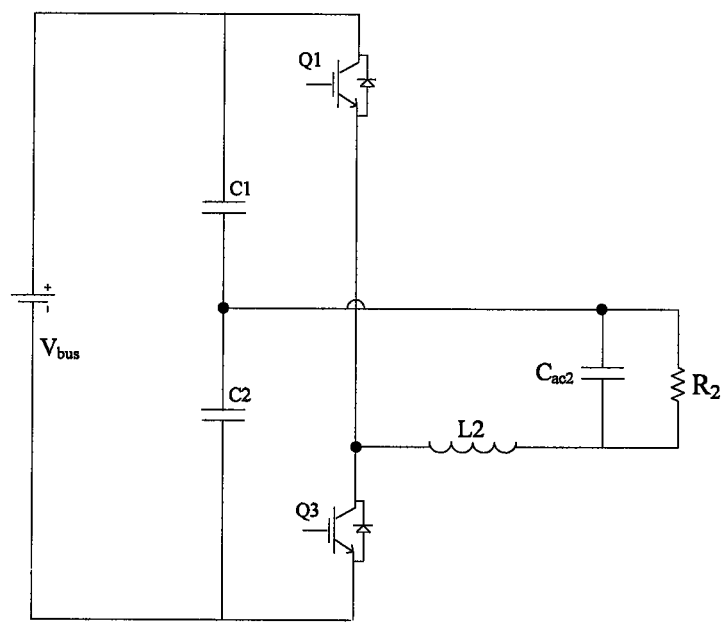
FIG. 9 is a simplified circuit diagram of the second inverter shown in FIG. 8.

In FIG. 8, the second inverter is composed of the first bus capacitor C1, the second bus capacitor C2, the first switching element Q1, the third switching element Q3, the sixth switching element Q6, the second output inductor L2 and the second output capacitor $C_{ac2}$. The topology after simplification in the same manner as above is shown in FIG. 9. The modulation mode of the second inverter may be a conventional half-bridge control mode, in which the output voltage closed loop control would produce the controlled duty cycle to the first switching element Q1, the third switching element Q3 and the first switching element Q1 are complementary to each other, and the sixth switching element Q6 are normally on.

Figure 10:
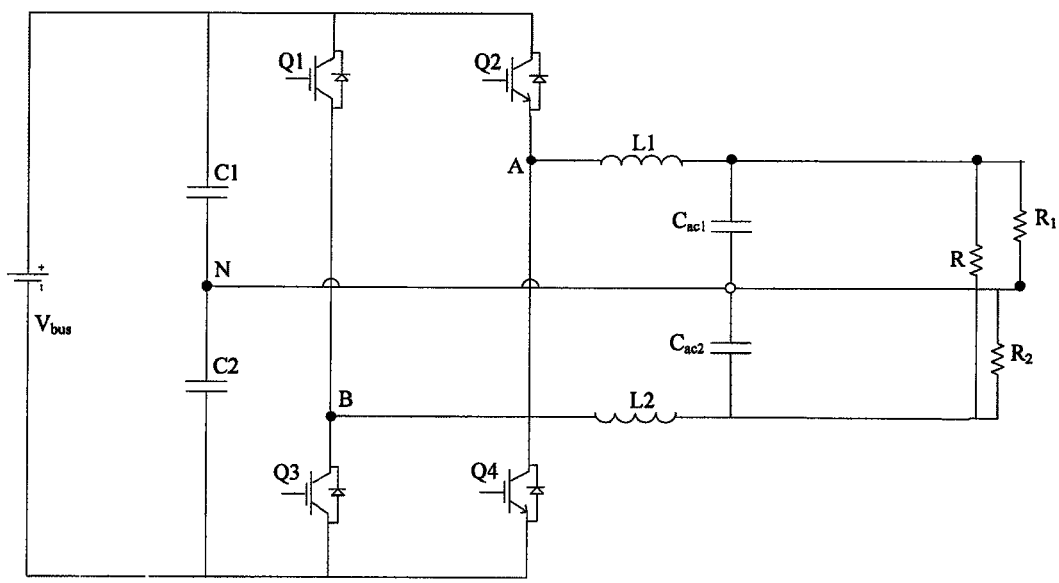
FIG. 10 is a schematic diagram showing a simplified circuit obtained by series connection of output voltages of the first inverter and the second inverter when the power conversion device is in the standalone operation.

When the two inverter output voltages of the first inverter and the second inverter work at the same time, an equivalent circuit diagram is as shown in FIG. 10. Modulating waveforms of an AN phase output voltage and a BN phase output voltage ensure a 180 degree phase difference, and a voltage obtained by series connection of the two phases of inverter voltages has an amplitude twice of the amplitude of each of the two phases of voltages and has a frequency consistent with that of each of the two phases of voltages.

Figure 11:
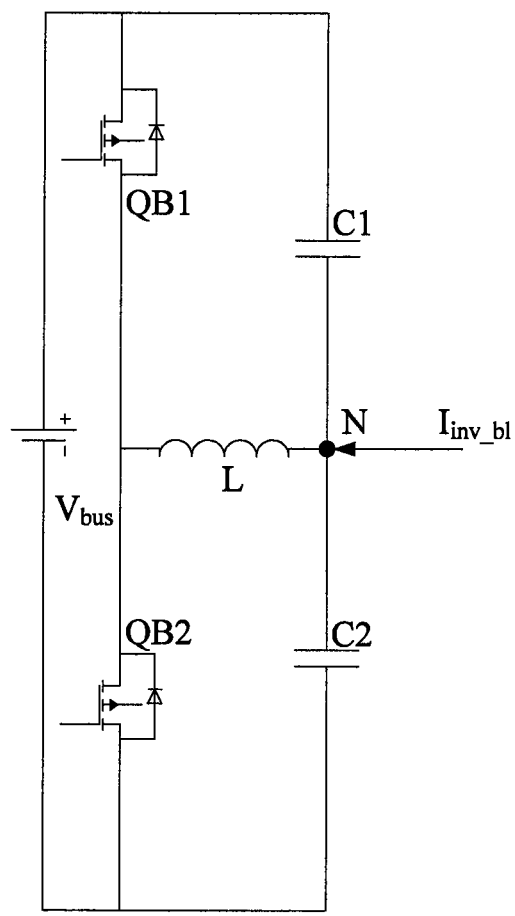
FIG. 11 is a simplified circuit diagram of FIG. 3.

Moreover, considering that the voltages across the first bus capacitor C1 and the second bus capacitor C2 will become unbalanced when two loads are unbalanced during standalone operation mode of the inverter, the voltage balance of the first bus capacitor C1 and the second bus capacitor C2 is controlled via the voltage-balanced half-bridge circuit 20. The topology of the half-bridge circuit 20 after simplification is as shown in FIG. 11. With neglecting of the current perturbation of the middle point of the half-bridge circuit 20 (the inverter outputs the difference of the output current from the inverter AN and the inverter BN), a mathematical model of the half-bridge circuit 20 is established, a loop equation when switching on the first switch QB1 and a loop equation when turning off the first switch QB1 are respectively written, and a relationship between the voltage difference $\Delta u_C(s)$ of the first bus capacitor C1 and the second bus capacitor C2, and the drive duty ratio $d_{up}(s)$ of the first switch QB1 is derived as shown in Formula (1), where Cs represents the capacitance of the first bus capacitor C1 (second bus capacitor C2), Ls represents the inductance of the inductor in FIG. 11, r represents the equivalent resistance of the inductor, $u_{bus}$ represents a voltage value provided by the power supply module, and $u_{C_2}(s)$ represents the voltage across the second bus capacitor C2.

$$\Delta u_C(s) = \frac{d_{up}u_{bus} - u_{C_2}(s)}{Cs(Ls+r)} \quad \text{Formula (1)}$$

With neglecting of the voltage perturbation across the second bus capacitor C2, there is:

$$\Delta u_C(s) = \frac{d_{up}u_{bus}}{Cs(Ls+r)} \quad \text{Formula (2)}$$

Figure 12:
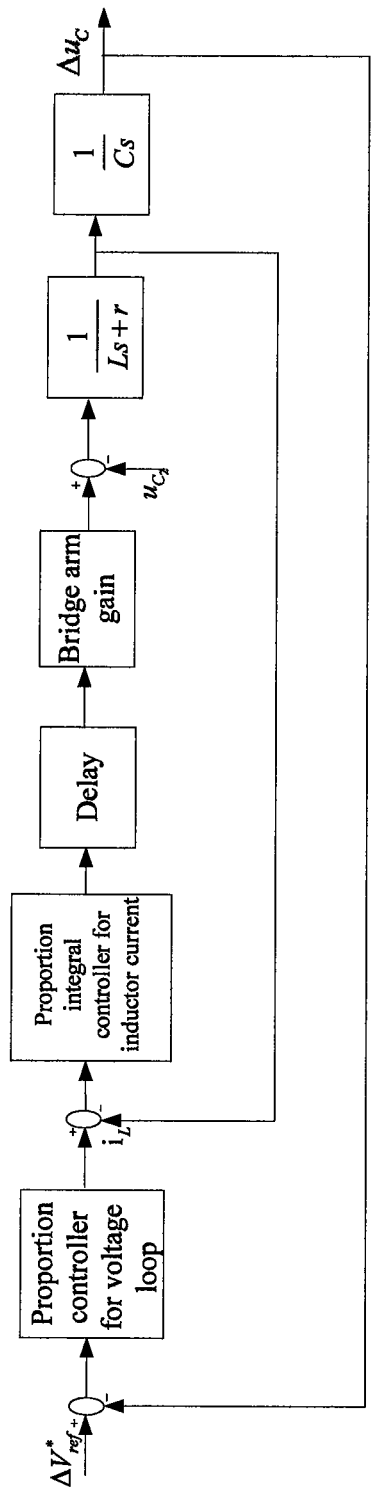
FIG. 12 is a control block diagram of the balanced half-bridge circuit.
Figure 13:
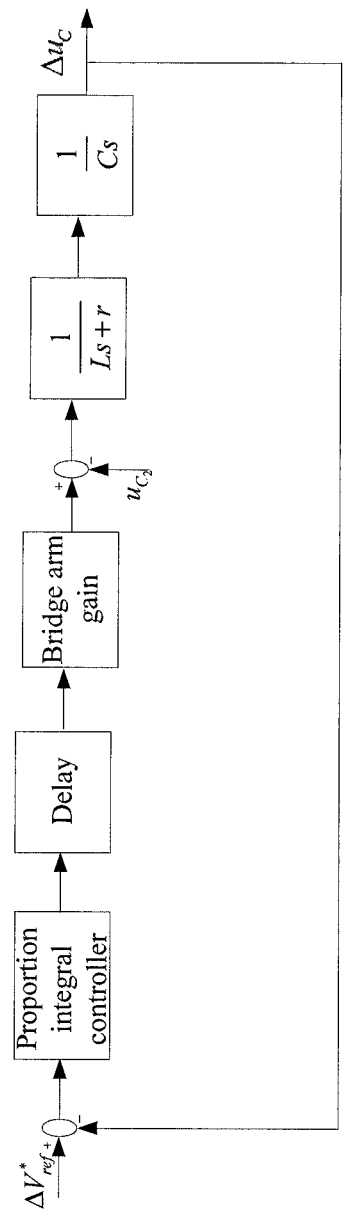
FIG. 13 is a control block with inner current control loop of the balanced half-bridge circuit.
Figure 14:
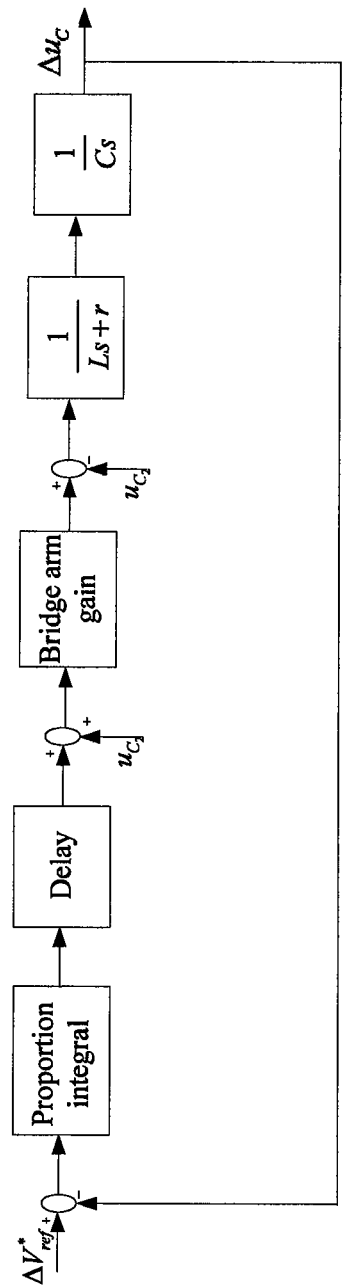
FIG. 14 is a control block with the feedforward voltage of the second capacitor.

A PI (proportion integral) control block diagram as shown in FIG. 12 can be obtained according to the Formula (2), and in this control block diagram, a delay elements includes a sampling delay and control delay. When the current perturbation on the middle point is larger, the voltage balance on the middle point cannot be better realized using a PI control loop. If it is desired to quickly suppress the perturbation and satisfy the voltage balance on the common node of the first bus capacitor C1 and the second bus capacitor C2, a huge fluctuation of the voltage across the second bus capacitor C2 will be caused when the current perturbation on the middle point is larger. The exemplary embodiment provides two solutions: one solution is to introduce an inner-loop control using a sampling current of an inductor of the voltage-balanced half-bridge 20; and the second solution is to introduce a feedforward of the voltage across the second bus capacitor C2. The two solutions are specifically and respectively shown in FIGS. 13 and 14, and both of the two solutions may have a strong suppression effect on the perturbation.

A voltage balance control circuit is used to suppress the unbalance between the voltage across the first bus capacitor C1 and the second bus capacitor C2. Therefore, when the loads are symmetric and relatively light, the half-bridge circuit 20 may be arranged to do not work. Nevertheless, when the loads are asymmetric or relatively heavy, the half-bridge circuit 20 employs a burst control mode so that the half-bridge circuit 20 suppresses the voltage difference when the voltage difference is relatively large, while the first switch QB1 and the second switch QB2 are turned off so as to reduce losses when the voltage difference is relatively small.

A DC bus voltage control value is based on k times of the peak output voltage of the inverter, and k can be 1.05 to 1.35 usually. It is supposed that the voltages across the first bus capacitor C1 and the second bus capacitor C2 are balanced, the voltage values across the first bus capacitor C1 and the second bus capacitor C2 are respectively a half of the DC bus voltage control value, then there is:

$$V_{bus} = \sqrt{2}\,kV_{rms} \quad \text{Formula (3)}$$

$$V_{bus\_up} = V_{bus\_dw} = \frac{1}{2}V_{bus} = \frac{\sqrt{2}\,k}{2}V_{rms}$$

where $V_{rms}$ represents the root mean square(RMS) value of line voltage of the inverter output, and k is a coefficient set in consideration of the voltage drop across a inverter bridge arm and a dynamic margin, $V_{bus\_up}$ represents the voltage across the first bus capacitor C1, and $V_{bus\_dw}$ represents the voltage across the second bus capacitor C2.

Considering that the perturbation of the output voltage on the voltage-balanced half-bridge 20 is a sinusoidal signal, 0.4%~10% of the output voltage of the inverter bridge arm is reserved for the regulation of the voltage-balanced half-bridge circuit 20. Taking the voltage across the first bus capacitor C1 as an example, the minimum of a half bus voltage needs to meet the following condition:

$$V_{bus\_up} > \frac{\sqrt{2}\,k_{min}}{2}V_{rms}$$

Therefore, it is supposed that:

$$\Delta V \le V_{bus\_up} - V_{bus\_up\_min}$$

For example, the output voltage of the inverter bridge arm is 200V, and the peak of the output voltage of the inverter bridge arm is 200V*1.414, and then the designed working range of the DC bus voltage according to the above method is 297V~382V (200V×1.414×[1.05, 1.35]). It is supposed that the bus voltage is 330 v, then the reserved voltage difference value can be 33V (i.e., 330V-297V). When the actual voltage difference is less than 16.5V, the half-bridge circuit 20 does not work, while when the actual voltage difference is greater than or equal to 16.5V, the half-bridge circuit 20 works.

Although it is explained by taking the H6 topology for example in the foregoing exemplary embodiment, the bridge conversion circuit 30 may also be other circuit topologies such as the H4 topology, the H5 topology and the like in other exemplary embodiments of the present disclosure.

Figure 15:
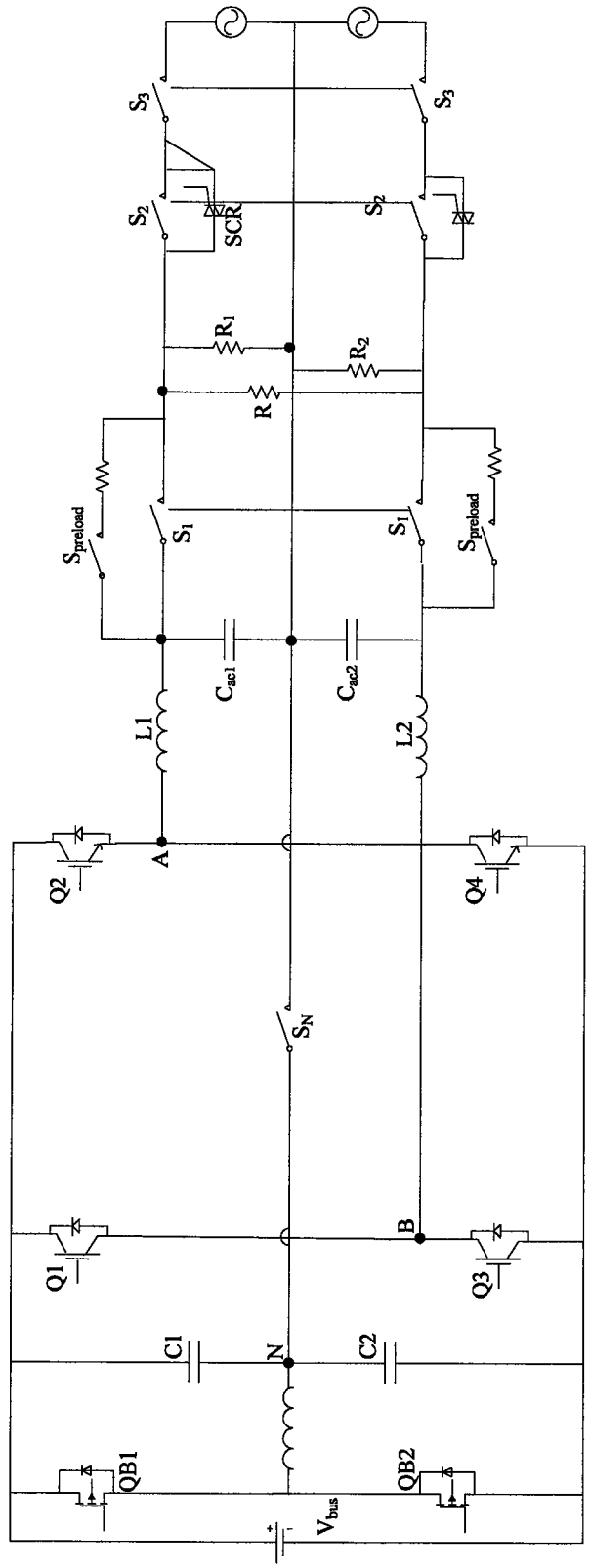
FIG. 15 is a circuit diagram of another power conversion device according to exemplary embodiments of the present disclosure.

As shown in FIG. 15, the bridge conversion circuit 30 has a conventional H4 topology. During a grid-connected operation, the controlled switch $S_N$ is turned off, and the control method can either be unipolar or bipolar, and thus a single-phase two-wire voltage source is usually output. During a standalone operation, the controlled switch $S_N$ is turned on, and two independent voltage sources having half-bridge inverter output circuit topologies can be formed and are connected in series at the output side, and consequently, $u_{AN}=u_{BN}$ is similarly ensured, i.e., a single-phase three-wire voltage source can be output during the standalone operation.

Figure 16:
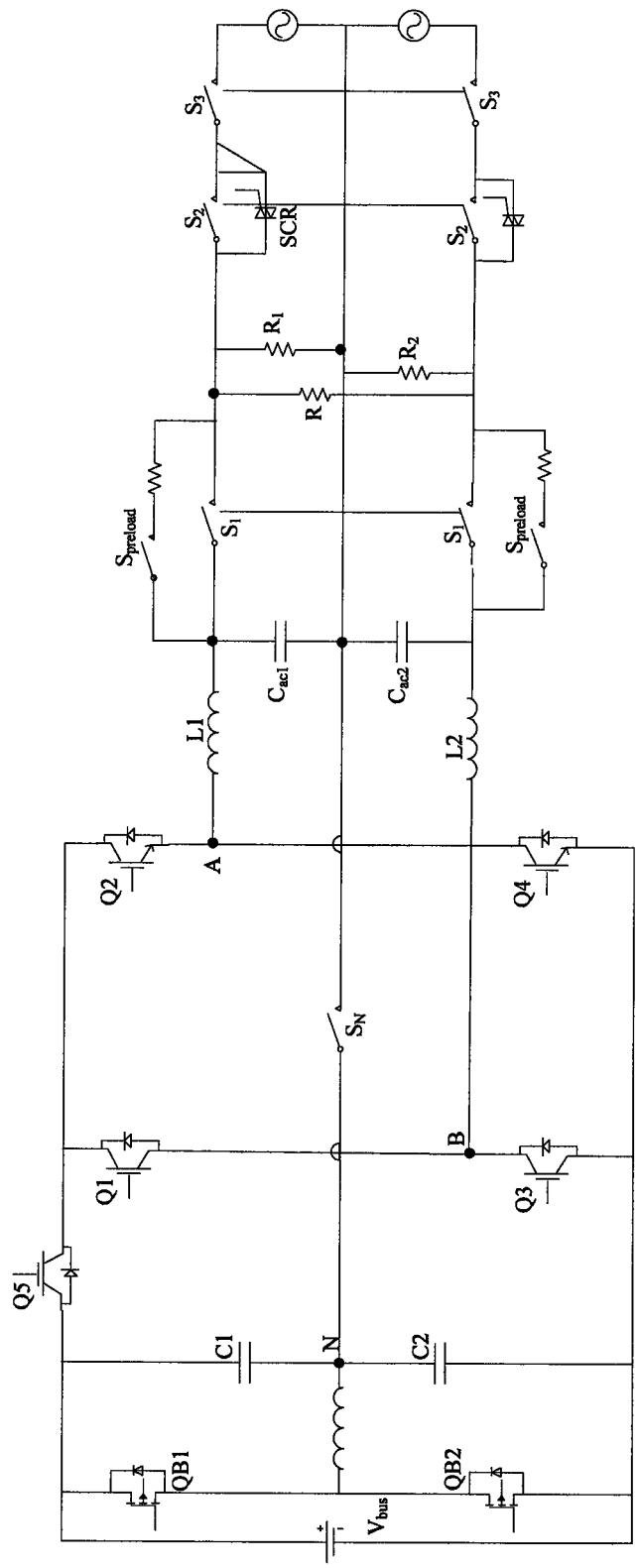
FIG. 16 is a circuit diagram of another power conversion device according to exemplary embodiments of the present disclosure.

As shown in FIG. 16, the bridge conversion circuit 30 is a H5 topology with low leakage current. When the H5 topology is incorporated into the power conversion device in the exemplary embodiment, both outputting a single-phase two-wire voltage source during a grid-connected operation and outputting a single-phase three-wire voltage source during a standalone operation can be realized. For example, during the grid-connected operation, the controlled switch $S_N$ is turned off, and the fifth switching element Q5 operates according to the modulating approach for a single-phase current source; during the standalone operation, the controlled switch $S_N$ is turned on, and the fifth switching element Q5 is normally off.

For details of the bridge output filter circuit, the relay protection device, related switching components and control units in the foregoing power conversion device may be found in relevant prior art. For example, the first output capacitor $C_{ac1}$, the second output capacitor $C_{ac2}$, the first output inductor L1, the second output inductor L2, preload switches $S_{preload}$, a relay switching element S1, a relay switching element S2, a relay switching element S3, a resistor R, a resistor R1, a resistor R2 and a bidirectional thyristor SCR and the like may be included, which will not be described in details in the exemplary embodiment.

Figure 17:
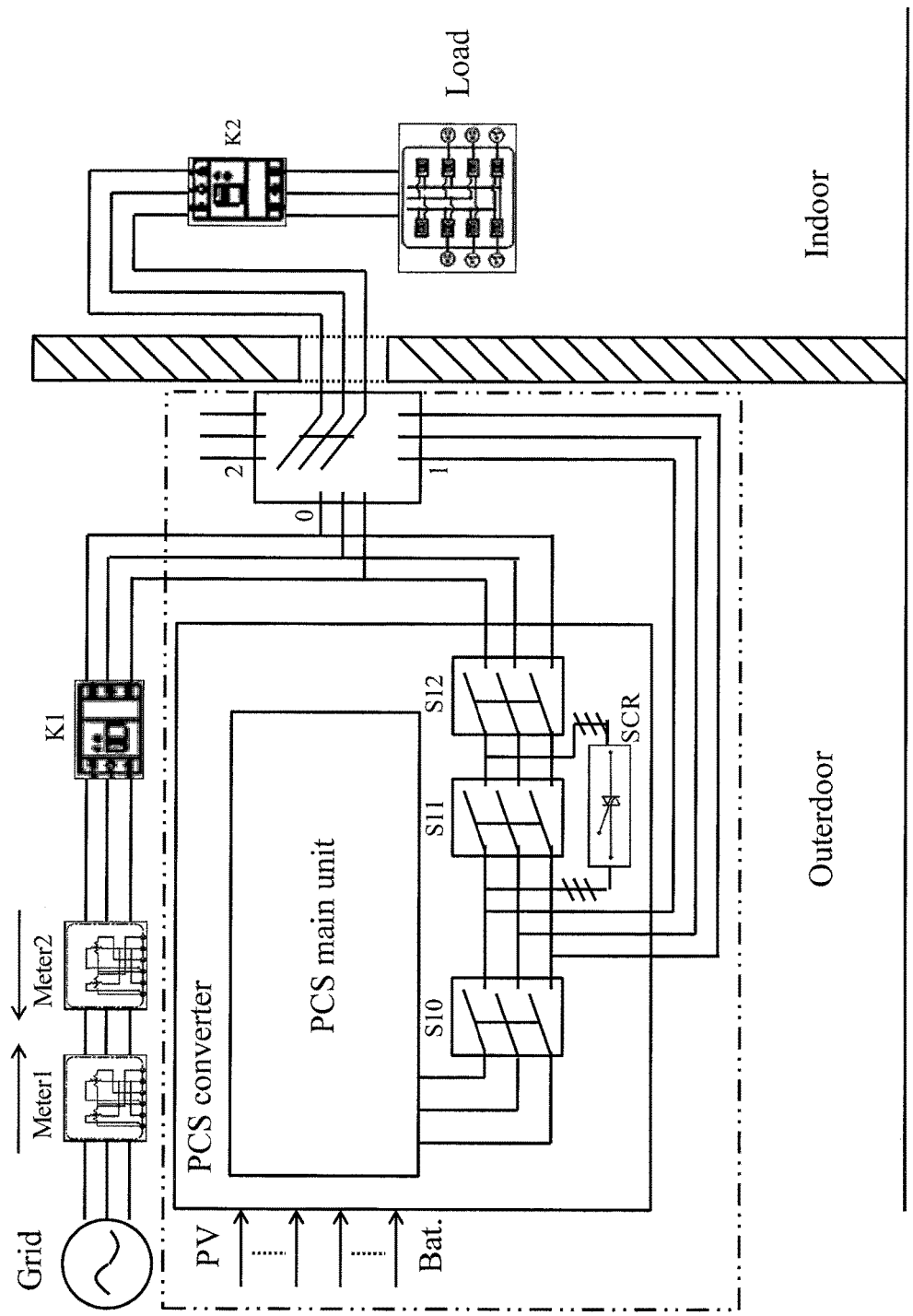
FIG. 17 is a circuit diagram of a power supply system according to exemplary embodiments of the present disclosure.

In an exemplary embodiment, there is also provided a power supply system. As shown in FIG. 17, the power supply system includes a first power supply module and a second power supply module. The first power supply module and the second power supply module are coupled with a load through at least two wires. The first power supply module includes any one of the power conversion devices in the foregoing exemplary embodiments, and may further include a first port 0 and a second port 1. The second power supply module may be a grid. The first port 0 is electrically coupled to the second power supply module, and the load is selectively coupled with the first port 0 or the second port 1 through a selector switch. The power conversion device is electrically coupled to the first port 0 via an output switch S10 and grid-connected switches S11 and S12, and the power conversion device is electrically coupled to the second port 1 via the output switch S10. With the on/off corporation among the output switch S10, the grid-connected switches S11 and S12, and the selector switch, the power supply system may use the first power supply module and/or the second power supply module to supply power for the load. For instance, when both the first power supply module and the second power supply module work normally, the selector switch is electrically coupled with the first port 0 or the second port 1, the output switch S10 and the grid-connected switches S11 and S12 are all turned on, and the first power supply module and the second power supply module supply power to the load at the same time. When the second power supply module works abnormally, the selector switch is electrically coupled with the second port 1, the output switch S10 is turned on, the grid-connected switches S11 and S12 are turned off, and only the first power supply module supplies power to the load. When the second power supply module works normally, the selector switch is electrically coupled with the first port 0, the output switch S10 is turned off, the grid-connected switches S11 and S1 are turned off, and only the second power supply module supplies power to the load. Or, when the second power supply module works normally, the selector switch is electrically coupled with the second port 1, the output switch S10 is turned off, the grid-connected switches are turned on, and only the second power supply module supplies power to the load.

Again referring to FIG. 17, the power conversion device is applied into a PCS (Power Conversion System) converter part, and a BAT (DC cell) input terminal as shown in FIG. 17 may either be directly connected to an inverter input port, or connected to an inverter input bus port through a converter. Through the wiring solution as shown in FIG. 17, the original power distribution solution of a user is not influenced at all; during a grid-connected operation, energy can be provided through interaction of a single-phase two-wire output and the grid; during an standalone operation, the PCS converter provides a single-phase three-wire voltage source output which is consistent with the power supply output of the grid under the original power distribution of the user. Therefore, the original power distribution structure of the user does not need to be adjusted.

Taking a household application as an example (a single-phase three-wire system is as shown in FIG. 17, and other systems are similar), according to the household power distribution connection manner as shown in FIG. 17, the grid after passing through an indoor meter, is connected to a capacity-limitation breaker K1 of a power company, and then is connected to an indoor electrical load after passing through an indoor leakage protection breaker K2. It should be noted that the capacity-limitation breaker K1 of the power company is not always connected indoors, and may also be connected outdoors. The two connection manners have no essential differences for user's indoor, and only need to connect three power wires (L1, L2 and N) into the interior of the household, and do not involve in structural modifications of an indoor power distribution connection system. In order to improve the power supply reliability and quality for the user, to improve the economic benefits of using electric energy and to save the energy and protect the environment, another independent power source (PCS) is connected to the household via the power distribution wiring manner as shown in FIG. 17, and this does not need to make any structural modification on the original power distribution connection system inside the household; i.e., only the parts in the dotted box are inserted between the capacity-limitation breaker K1 of the power company and the leakage protection breaker K2, while the indoor parts do not need to be altered, and only three incoming wires are connected indoors (the present embodiment illustrates a single-phase three-wire system, and other systems are similar), and it is very easy to upgrade the existing household power supply distribution system. Rather, due to the connection of another independent power source (PCS), the energy at the grid side can flow bidirectionally. Therefore, a measure meter needs to be changed into a bidirectional charging meter, such as a first measure meter Meter1 and a second measure meter Meter2 as shown in FIG. 17; moreover, the measuring directions of the first measure meter Meter1 and the second measure meter Meter2 are opposite. When the grid is normal, the system is in a grid-connected operation; and when the grid encounters with a failure, the system is in a standalone operation. During the standalone operation, if the grid returns back to a normal state, the system switches into the grid-connected operation mode seamlessly.

In conclusion, the power conversion device provided by the exemplary embodiments of the application may works not only in the grid-connected operation but also in the standalone operation, and can provide a single-phase three-wire output during the standalone operation. For a scenario where the respective requirement of the grid-connected operation and the standalone operation are different, the exemplary embodiments of the present disclosure modify the existing low leakage current H4, H5, or H6 topologies and the like to satisfy that, during the grid-connected operation, the input power of the renewable energy source at the input terminal of the inverter is converted to the power at the output port of the inverter and thereby is connected to a single-phase line voltage; during the standalone operation, a single-phase three-wire voltage source output can be realized by adding small number of components.

The present disclosure has been described in the foregoing related embodiments. However, the foregoing embodiments are examples of implementing the present invention merely. It should be noted that the disclosed embodiments do not limit the scope of the present invention. Instead, alternations and modification figured out without departing from the spirit and scope of the present invention shall all pertain to the patent protection scope of the present invention.

What is claimed is:

1. A power conversion device for converting electric energy outputted by a power supply module, which is coupled with first and second bus capacitors in series, the power conversion device comprising:
   an electric energy conversion module configured to convert the electric energy outputted by the power supply module into a single-phase two-wire output or a single-phase three-wire output, wherein the electric energy conversion module comprises:
      a voltage-balanced half-bridge circuit having a bridge arm midpoint coupled with each first terminal of the first and second bus capacitors;
      a bridge conversion circuit having a first input terminal coupled with a second terminal of the first bus capacitor, a second input terminal coupled with a second terminal of the second bus capacitor, and first and second output terminals providing the single-phase two-wire output; and
      a neutral line having a first terminal coupled with the bridge arm midpoint, and a second terminal providing the single-phase three-wire output together with the first and second output terminals of the bridge conversion circuit; and
   a switching module coupled with the electric energy conversion module, and configured to determine the electric energy conversion module to provide the single-phase two-wire output or the single-phase three-wire output;
   wherein the bridge conversion circuit comprises a full-bridge inverter circuit which comprises:
      a first switching element having a first terminal, a second terminal and a control terminal, the first terminal of the first switching element being coupled with the second terminal of the first bus capacitor;
      a second switching element having a first terminal, a second terminal and a control terminal, the first terminal of the second switching element being coupled with the first terminal of the first switching element;
      a third switching element having a first terminal, a second terminal and a control terminal, the second terminal of the third switching element being coupled with the second terminal of the second bus capacitor;
      a fourth switching element having a first terminal, a second terminal and a control terminal, the second terminal of the fourth switching element being coupled with the second terminal of the third switching element;
      a fifth switching element having a first terminal, a second terminal and a control terminal, the first terminal of the fifth switching element being coupled with the second terminal of the first bus capacitor;
      a sixth switching element having a first terminal, a second terminal and a control terminal, the first terminal of the sixth switching element being coupled with the second terminal of the first switching element and the first terminal of the fifth switching element, and the second terminal of the sixth switching element being coupled with the first terminal of the third switching element; and
      a seventh switching element having a first terminal, a second terminal and a control terminal, the first terminal of the seventh switching element being coupled with the second terminal of the fifth switching element, and the second terminal of the seventh switching element being coupled with the second terminal of the second switching element and the first terminal of the fourth switching element.

2. The power conversion device according to claim 1, wherein the power supply module is a photovoltaic power generator or a fuel cell power generator, and the electric energy conversion module is a Direct Current to Alternating Current (DC/AC) converter.

3. The power conversion device according to claim 1, wherein the switching module comprises a controlled switch arranged between the first terminal and the second terminal of the neutral line.

4. The power conversion device according to claim 1, wherein each of the first switching element, the second switching element, the third switching element, the fourth switching element, the fifth switching element, the sixth switching element and the seventh switching element in the bridge conversion circuit is a MOSFET, an IGBT or a BJT, and is made of Si, SiC or GaN.

5. The power conversion device according to claim 1, wherein the seventh switching element is a MOSFET, an IGBT, a BJT or a relay.

6. The power conversion device according to claim 1, wherein the switching module comprises a MOSFET, an IGBT, a BJT, a thyristor or a relay.

7. The power conversion device according to claim 1, wherein a switching element in the voltage-balanced half-bridge circuit is a MOSFET, an IGBT or a BJT, and the switching element is made of Si, SiC or GaN.

8. The power conversion device according to claim 1, wherein the voltage-balanced half-bridge circuit is controlled via a PI loop, and the PI loop further comprises:
   an inner loop for controlling a sampling current of an inductor of the half-bridge circuit; or an outer loop for controlling a feedforward voltage of the second bus capacitor.

9. The power conversion device according to claim 8, wherein the voltage-balanced half-bridge circuit is enabled when a voltage difference between the voltage of the first bus capacitor and the voltage of the second bus capacitor is no less than a predetermined threshold; and the half-bridge circuit is cut off when the voltage difference between the voltage of the first bus capacitor and the voltage of the second bus capacitor is less than the predetermined threshold.

10. The power conversion device according to claim 1, further comprising:
a bridge output filter configured to filter the single-phase two-wire output or the single-phase three-wire output.

11. A power supply system, comprising a first power supply module and a second power supply module which are coupled with a load through at least two wires;
wherein the first power supply module comprises a power conversion device, a first port and a second port, the first port is electrically coupled to the second power supply module, and the load is selectively coupled with the first port or the second port through a selector switch;
wherein the power conversion device is electrically coupled to the first port via an output switch and a grid-connected switch, and the power conversion device is electrically coupled to the second port via the output switch; and
wherein the power supply system employs at least one of the first power supply module and the second power supply module to provide power supply for the load according to the output switch, the grid-connected switch and the selector switch;
wherein the power conversion device is used for converting electric energy outputted by a photovoltaic power generator or a fuel cell power generator, which is coupled with first and second bus capacitors in series, the power conversion device comprising:
an electric energy conversion module configured to convert the electric energy outputted by the photovoltaic power generator or a fuel cell power generator into a single-phase two-wire output or a single-phase three-wire output, wherein the electric energy conversion module comprises:
a voltage-balanced half-bridge circuit having a bridge arm midpoint coupled with each first terminal of the first and second bus capacitors;
a bridge conversion circuit having a first input terminal coupled with a second terminal of the first bus capacitor, a second input terminal coupled with a second terminal of the second bus capacitor, and first and second output terminals providing the single-phase two-wire output; and
a neutral line having a first terminal coupled with the bridge arm midpoint, and a second terminal providing the single-phase three-wire output together with the first and second output terminals of the bridge conversion circuit; and
a switching module coupled with the electric energy conversion module, and configured to determine the electric energy conversion module to provide the single-phase two-wire output or the single-phase three-wire output;
wherein the bridge conversion circuit comprises a full-bridge inverter circuit which comprises:

a first switching element having a first terminal, a second terminal and a control terminal, the first terminal of the first switching element being coupled with the second terminal of the first bus capacitor;
a second switching element having a first terminal, a second terminal and a control terminal, the first terminal of the second switching element being coupled with the first terminal of the first switching element;
a third switching element having a first terminal, a second terminal and a control terminal, the second terminal of the third switching element being coupled with the second terminal of the second bus capacitor;
a fourth switching element having a first terminal, a second terminal and a control terminal, the second terminal of the fourth switching element being coupled with the second terminal of the third switching element;
a fifth switching element having a first terminal, a second terminal and a control terminal, the first terminal of the fifth switching element being coupled with the second terminal of the first bus capacitor;
a sixth switching element having a first terminal, a second terminal and a control terminal, the first terminal of the sixth switching element being coupled with the second terminal of the first switching element and the first terminal of the fifth switching element, and the second terminal of the sixth switching element being coupled with the first terminal of the third switching element; and
a seventh switching element having a first terminal, a second terminal and a control terminal, the first terminal of the seventh switching element being coupled with the second terminal of the fifth switching element, and the second terminal of the seventh switching element being coupled with the second terminal of the second switching element and the first terminal of the fourth switching element.

12. The power supply system according to claim 11, wherein when both the first power supply module and the second power supply module work in normal operation, the selector switch is electrically coupled with the first port or the second port, the output switch and the grid-connected switch are turned on, and the first power supply module and the second power supply module provide power supply for the load.

13. The power supply system according to claim 12, wherein the second power supply module comprises a first measure meter, a second measure meter and a capacity-limitation breaker which are connected subsequently in series, the first measure meter and the second measure meter have opposite measuring directions, and energy can be transferred from the first power supply module to the second power supply module or from the second power supply module to the first power supply module.

14. The power supply system according to claim 11, wherein when the second power supply module works abnormally, the selector switch is electrically coupled with the second port, the output switch is turned on, the grid-connected switch is turned off, and only the first power supply module provides power supply for the load.

15. The power supply system according to claim 11, wherein when the second power supply module works in normal operation, the selector switch is electrically coupled with the first port, the output switch is turned off, the grid-connected switch is turned on, and only the second power supply module provides power supply for the load.

16. The power supply system according to claim 11, wherein when the second power supply module works in normal operation, the selector switch is electrically coupled with the second port, the output switch is turned off, the grid-connected switch is turned on, and only the second power supply module provides power supply for the load.

\* \* \* \* \*